Sept. 16, 1969  A. U. BRYANT  3,467,394
PACKING MEANS
Filed Oct. 15, 1965  4 Sheets-Sheet 1
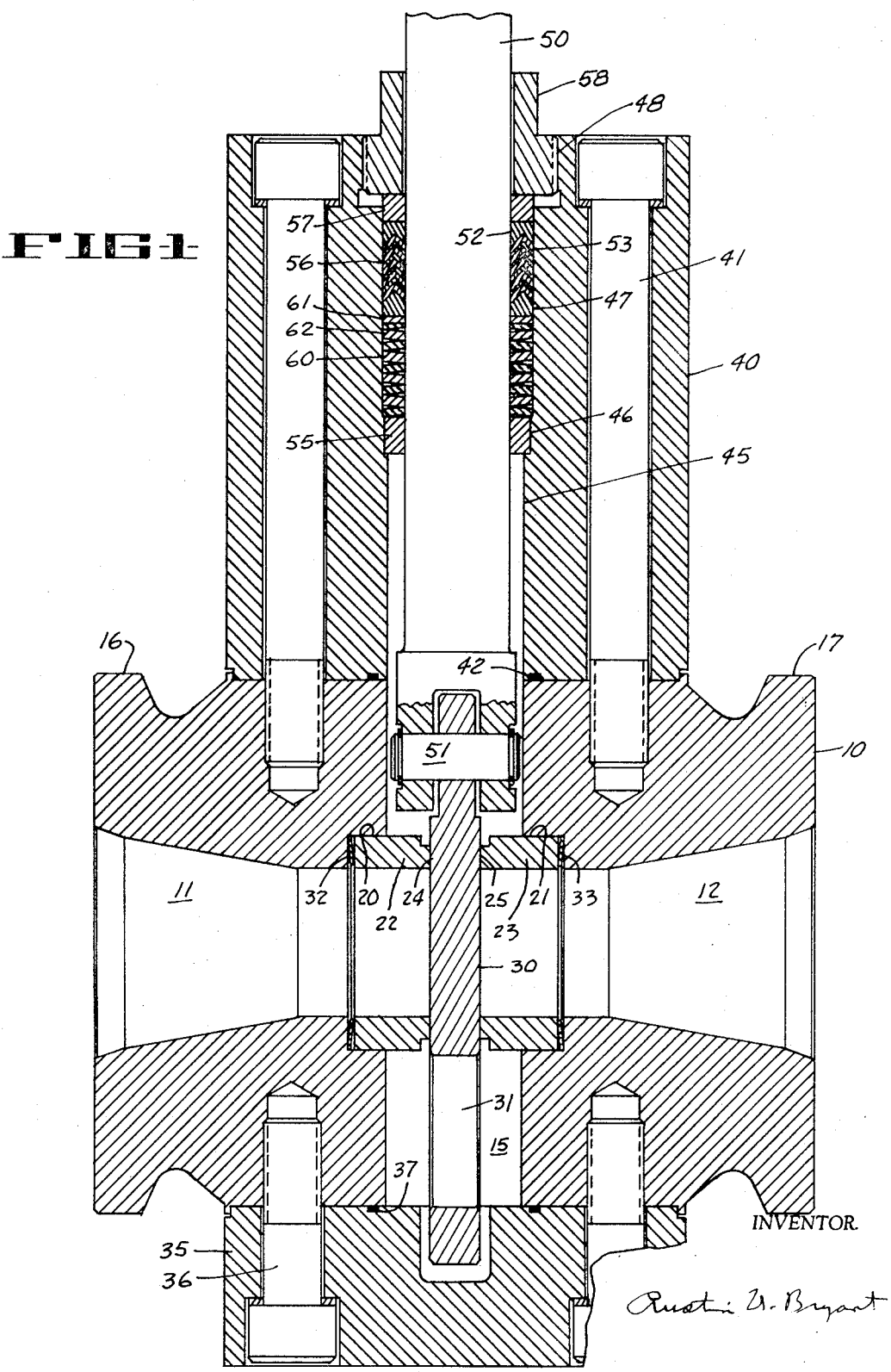
INVENTOR.
Austin U. Bryant Sept. 16, 1969   A. U. BRYANT   3,467,394
PACKING MEANS
Filed Oct. 15, 1965   4 Sheets-Sheet 2
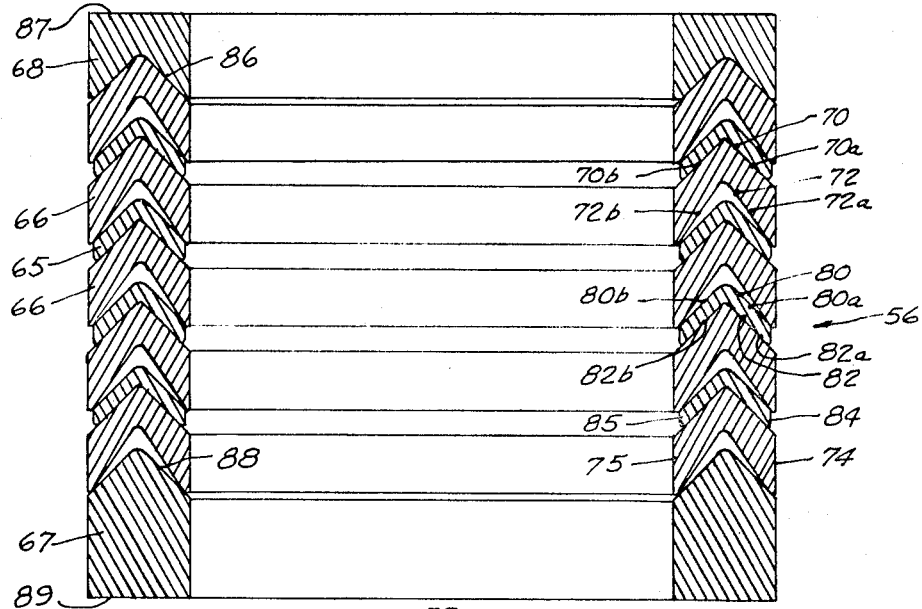
FIG-2-
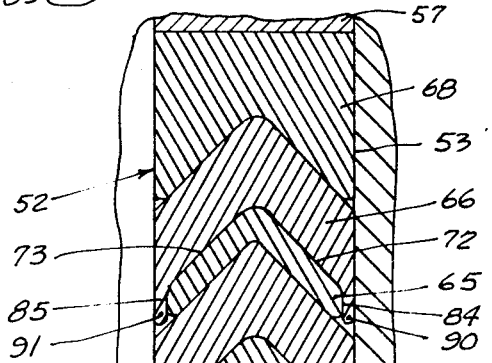
FIG-3-
INVENTOR.
Austin U. Bryant

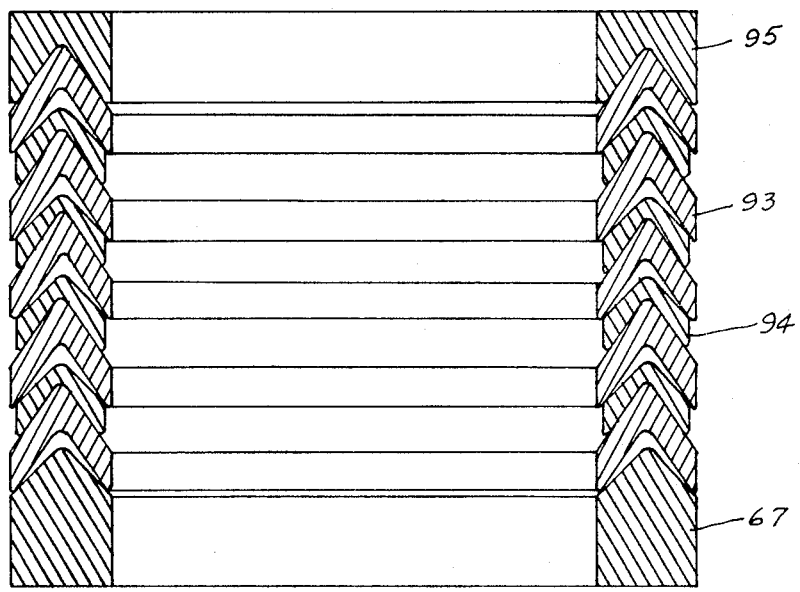
FIG-4-
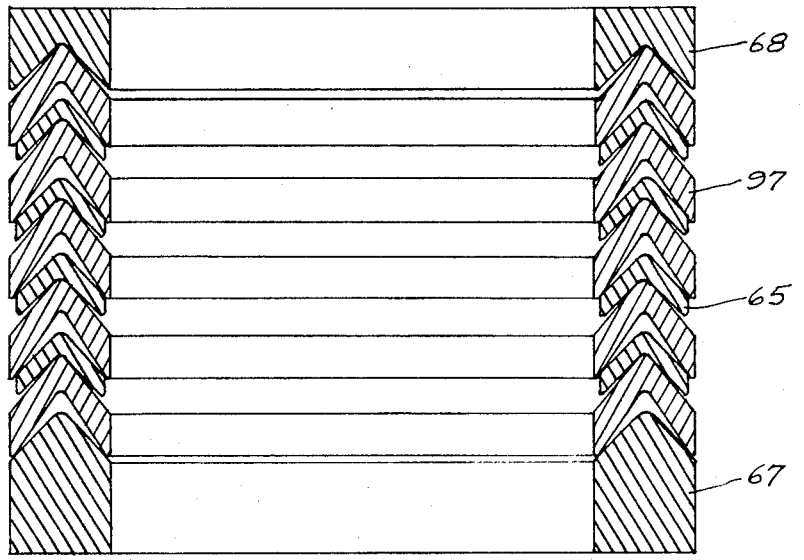
FIG-5-

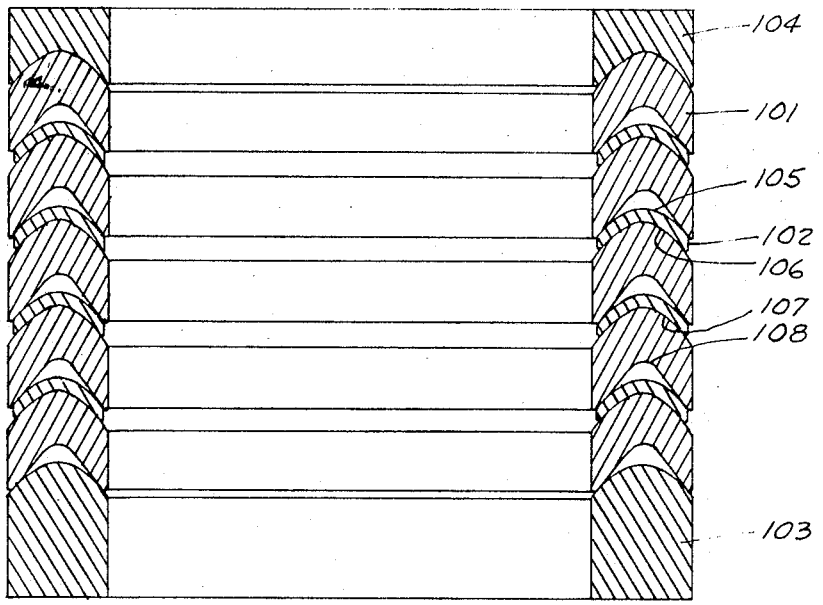
FIG-6-

United States Patent Office 3,467,394
Patented Sept. 16, 1969

3,467,394
PACKING MEANS
Austin U. Bryant, Walnut Creek, Calif., assignor to Grove Valve and Regulator Company, Oakland, Calif., a corporation of California
Filed Oct. 15, 1965, Ser. No. 496,519
Int. Cl. F16j 15/00, 15/32
U.S. Cl. 277—1          17 Claims

ABSTRACT OF THE DISCLOSURE

A packing assembly of the V-ring tape which is particularly adapted to use packing rings of a flexile material having a high degree of permanent set, such as polytetrafluoroethylene. In the preferred embodiments, relatively rigid V-ring shaped spacer rings are interposed between a plurality of V-packing rings. The initial shape of the packing rings, before the packing assembly is axially compressed in the packing gland, is such that the concave sides of the packing rings are more acutely convergent than the mating convex sides of the spacer rings. In addition, the spacer rings are provided with cylindrical inner and outer surfaces so dimensioned as to provide definite extrusion gaps with the respective walls of the packing gland to permit the formation of relatively thin lips on the packing rings when mechanical and pressure forces are applied to the packing assembly.

---

This invention relates to improved packing means for sealing a movable element against fluid pressure.

In the past, many types of packings for sealing against a cylindrical rod, variously called stem, rod or plunger packings, have been devised and utilized. For the most part, these fall generally into three classifications, namely, compression packings, V-ring type packings, and O-ring type packings.

The term, "V-ring type packing," is used here as a general expression to cover packings which employ annular packing rings having a cup shape cross section, with the open side of the cup facing axially against the direction of pressure, and whose sealing surfaces are on their inner and outer diameters. The cross section of these packing rings may be V-shape or U-shape or a variation of these. V-ring type packings usually employ a plurality of such packing rings stacked together.

V-ring type packing rings may be made from numerous flexile materials including various types of elastomers and plastics having varying degrees of hardness, strength, resiliency, permanent set, and cold flow.

Modern technology has brought forth the use of higher and higher pressures and at the same time, more adverse conditions of operation. A seal against a movable rod at pressures of 10,000 p.s.i. or more may readily be obtained using conventional methods if one has free choice of materials and lubricants. However where the choice of materials is limited by the chemical environment and the seal must operate without lubrication, the best conventional methods will produce a seal of questionable reliability and then only when using extreme care in the manufacture of the various parts, including the finish on the rod and on the inside of the packing gland.

The use of so-called "exotic fuels" such as hydrazine, nitrogen tetroxide, UDMH (unsymmetrical dimethylhydrazine) or RFNA (red fuming nitric acid) may limit the nonmetallic packing materials used to polytetrafluoroethylene, commonly sold under the trade name of Teflon, and the parts often must be supercleaned before assembly, thus eliminating all traces of lubrication of any kind.

Valves designed for this environment may be called upon to withstand pressures of 10,000 p.s.i. or more without any stem leakage. The problem is further complicated by the fact the same valve may also be required to hold helium at these pressures without showing any stem leakage. As is well known in the art, high pressure helium is very fluid and one of the most difficult materials to seal against.

Polytetrafluoroethylene is a flexile material unfortunately having a high degree of permanent set and cold flow and these physical characteristics make it unsuitable for use in conventionally designed seals for moving parts, particularly for extremely high pressures.

This invention relates to a new and improved V-ring type packing arrangement that may utilize materials such as polytetrafluoroethylene to seal tightly against extremely high pressures and at the same time be relatively simple to manufacture and extremely reliable.

One variation of V-ring type packings found in prior art utilized a plurality of packing rings stacked together, each ring having a greater depth on the concave side than on the convex side. The object, assuming the rings are stacked concave side down, was for the convex side of each packing ring, except the top one, to act as a spreader for the ring above to push the sealing faces into engagement with the sides of the packing gland. One difficulty with this prior art was that the action between any two packing rings tended to collapse the lower ring and thus defeat its purpose. It has been found that V-ring type packings of polytetrafluoroethylene made according to my invention are considerably more reliable under extremely high pressures than either the variation described above or more conventional V-ring type packings when made of the same material.

The preferred form of this invention comprises an improved packing assembly employing V-ring type packing rings of flexile material. The packing rings are separated by V-ring shaped spacer rings. The shape of the spacer rings relative to the packing rings and the packing gland not only allows pressure and mechanical forces applied to urge the packing rings into sealing engagement with the gland walls but also permits these forces to reshape the seal rings so as to enhance their sealing ability. This not only produces packing rings which fit perfectly in the space provided, but due to the "memory" characteristics of the packing ring material, produces improved sealing ability.

The advantage of this novel arrangement is most apparent when chemical and other considerations limit the choice of packing material to one having a relatively low resiliency and high permanent set, particularly when sealing against extremely high pressures such as the order of 6,000 to 10,000 p.s.i. or more.

An object of this invention is to provide a packing means which will form a tight seal with an axially or rotatably movable shaft, such as a valve operating stem, against extremely high pressures such as the order of 10,000 p.s.i. or more, is relatively simple to manufacture and has a high degree of reliability.

Another object of this invention is to provide a packing means of the V-ring type suitable for sealing a movable element against extreme pressures that may utilize plastic sealing material having a relatively high degree of permanent set and cold flow and a relatively low resiliency.

Another object of this invention is to provide a high pressure packing which will withstand the action of so-called "exotic fuels" such as hydrazine, nitrogen tetroxide, UDMH (unsymmetrical dimethylhydrazine), or RFNA (red fuming nitric acid).

Another object of this invention is to provide a packing having the foregoing characteristics which will seal tightly against extremely fluid materials such as high pressure helium.

Another object of this invention is to provide a packing having the above-named characteristics which is self-adjusting.

Another object of this invention is to provide a valve stem packing which may be made of materials suitable for use with "exotic fuels" and at the same time not be sensitive to side loads on the valve stem.

Other objects of the invention will be apparent from the following description.

Referring to the accompanying drawings:

FIG. 1 is a section view of a gate valve having a stem packing incorporating the invention.

FIG. 2 is an enlarged section view of the uncompressed stem packing assembly used in the valve of FIG. 1.

FIG. 3 is a further enlarged partial section view of a portion of the stem packing and gland from FIG. 1.

FIG. 4 is an enlarged section view similar to FIG. 2 but showing another embodiment of the invention.

FIG. 5 is an enlarged section view similar to FIG. 2 but showing a still further embodiment of the invention.

FIG. 6 is an enlarged section view similar to FIG. 2 but showing another embodiment of the invention using another form of V-type packing ring having curved concave and convex end surfaces.

To illustrate a principal use of the invention, FIG. 1 shows a gate valve designed for extremely high pressures for use with "exotic fuels" and/or helium. The valve comprises a body 10, having inflow and outflow passages 11 and 12, connecting with an internal body cavity 15. The inlet and outlet ends of the body are provided with flange portions 16 and 17 for connecting to external piping, not shown. Flow passages 11 and 12 are provided with counterbores 20 and 21 into which annular seat rings 22 and 23 are slidably fitted. Seat rings 22 and 23 are provided with valve working surfaces 24 and 25.

Valve gate 30 is slidably fitted between the valve seat working surfaces 24 and 25. The gate is movable between a lower closed position, as shown, and an upper open position. The valve gate 30 is provided with a port 31, which in the open position is aligned with flow passages 11 and 12.

Closure member 35 is attached to body 10 by means of capscrews 36 threaded into body 10 and the joint is sealed by means of seal ring 37.

Likewise, bonnet 40 is attached to body 10 by means of capscrews 41 and the joint therebetween is sealed by means of seal ring 42.

Bonnet 40 is provided with a bore 45 and counterbores 46, 47, and 48. Valve operating stem 50 is concentrically disposed in bore 45 and attached to valve gate 30 by means of pin 51.

The valve working surfaces 24 and 25 of seat rings 22 and 23 are urged against the gate by means of Belleville springs 32 and 33.

The axial dimensions of seat rings 22 and 23 and associated parts are such as to allow limited axial movement of the gate and seat ring assembly with reversal of differential pressure across the gate. Sufficient clearance is allowed in the pin joint between gate 30 and stem 50 to permit such axial movement.

Bearing bushing 55 is closely fitted into counterbore 46 and around stem 50 and serves as a lower guide for the stem. Packing assembly 56 provides a seal between the bonnet 40 and the slidable stem 50. In so doing, the inner surface of the packing assembly seals against the outer cylindrical surface 52 of stem 50 and the outer surface of the packing assembly seals against the inner cylindrical surface 53 of bore 47.

Bushing 57 is closely fitted in counterbore 47 and around stem 50 and serves as an upper guide for the stem. Packing adjusting nut 58 is threadably engaged in counterbore 48 and transfers pressure on packing assembly 56 thru bushing 57. Uniform pressure is maintained on packing assembly 56 by means of spring unit 60 which consists of a flat thrust washer 61 and a plurality of Belleville spring washers 62.

The upper end of stem 50 is attached to an operating gear, not shown, which provides axial movement for operation of the valve gate between closed and open positions.

Referring to FIG. 2, the packing assembly 56 comprises packing rings 66 and spacer rings 65. Adjacent packing rings 66 are separated from each other by spacer rings 65 as shown. A lower annular end cap 67 and an upper annular end cap 68 complete the assembly. Five packing rings are shown but the number may be either more or less.

FIG. 2 shows the packing assembly 56 in the uncompressed condition before being installed in the packing gland and compressed. Packing rings 66 are provided with upper convex surfaces 70, lower concave surfaces 72, an outer surface 74 and an inner surface 75. Convex surfaces 70 may comprise two conical surfaces 70a and 70b, while the concave surfaces 72 may also comprise two conical surfaces 72a and 72b.

Spacer rings 65 are provided with upper convex surfaces 80, lower concave surfaces 82, outer surfaces 84 and inner surfaces 85. The upper convex surface 80 may comprise conical surfaces 80a and 80b. The lower concave surface 82 may comprise conical surfaces 82a and 82b.

The angle between conical surfaces 82a and 82b on the concave surface of spacer rings 65 is approximately the same as the angle between conical surfaces 70a and 70b on the convex surface of the packing rings so the parts nest together in the uncompressed condition as shown in FIG. 2. However, conical surfaces 72a and 72b on the concave side of the packing rings 66 are formed at a lesser angle than the angle between surfaces 80a and 80b on the convex side of the spacer rings, thus making the concave surface 72 of the packing ring 66 more acutely convergent than the convex surfaces 80 of the spacer ring. By way of illustration, surfaces 80a and 80b on the convex side of the spacer rings, surfaces 82a and 82b on the concave side of the spacer rings, and surfaces 70a and 70b on the convex side of the packing rings may all be formed with angles of approximately 90° between each pair of conical surfaces, while the surfaces 72a and 72b on the concave side of the packing rings are formed with angles of approximately 60° between them.

The outer surfaces 74 and the inner surfaces 75 of the packing rings 66 may be formed cylindrical and of approximately the same diameters as the cylindrical surfaces 53 and 52, respectively, so the width of the cross section of the packing rings in the uncompressed condition may be approximately the same as the width of the packing gland. However, the packing rings may be formed either slightly wider or slightly narrower than the width of the packing gland.

For reasons which will be explained later, the outer surfaces 84 of spacer rings 65 are made slightly smaller in diameter than the surface 53 of counterbore 47, and the inner surfaces 85 of the spacer rings 65 are formed slightly larger than the surface 52 of operating stem 50.

Due to the adverse chemical environment under which this packing must operate, the packing rings are preferably formed of polytetrafluoroethylene, commonly sold under the trade name Teflon. Polytetrafluoroethylene is chemically inert to most substances. However, this material has a high degree of permanent set and cold flow and a relatively low resilience, particularly when subjected to extremely high pressures. An object of this invention is to best utilize the physical properties of this material in forming a movable seal of high reliability under extremely adverse conditions.

The spacer rings are formed of material having a higher degree of rigidity than the packing rings. They are normally formed of metal. Upper end cap 68 is dimensioned to fit closely with surfaces 52 and 53 of the packing gland. The lower concave surface 86 is made approximately the same shape as the concave surfaces of spacer rings 65. The upper surface 87 of end cap 68 is preferably flat.

Upper end cap 68 is preferably made of polytetrafluoroethylene filled with an inert reinforcing material such as Fiberglas. This material provides sufficient rigidity for end cap 68 to withstand the pressures involved without extruding. At the same time it provides sufficient flexibility so that the end cap 68 will completely bridge the width of the packing gland and thus prevent extrusion of the upper packing ring while at the same time allowing stem 50 to slide freely.

Lower end cap 67 is preferably made a close fit in the packing gland, principally to aid in guiding the stem. It is also preferably made of reinforced polytetrafluoroethylene. The upper convex surface 88 of the lower end cap is formed approximately the same shape as the upper convex surfaces of the spacer rings 65. The lower surface 89 of the lower end cap is preferably flat.

Packing assembly 56 is installed as shown in FIG. 1, and compressed by turning adjusting nut 58. Adjusting nut 58 pushes on bushing 57 which in turn compresses the packing assembly. The lower end of the packing assembly rests on the spring assembly 60. Spring assembly 60 is not strictly necessary but it serves to maintain pressure on the packing assembly 56, and will eliminate the necessity of frequent adjustments of nut 58. By careful control of dimensions, the adjustable feature of nut 58 may be eliminated and the packing assembly installed in a fixed dimension gland.

The compressive force supplied by the spring unit 60 only represents the initial force on the packing assembly. When pressure is applied inside of the valve body, it acts in the same direction as the spring unit 60 on the bottom of the packing unit and further aids in the compression. Thus the compression means includes pressure forces as well as mechanical forces.

FIG. 3 shows a portion of the packing assembly in FIG. 1 greatly enlarged. Under the forces and pressures involved the plastic packing rings are deformed so as to practically fill in all the voids and reduce the packing assembly to a compact mass. Due to the physical characteristics of the material from which the packing rings are made, these rings take on a permanent deformation so that if they were removed from the assembly, they would maintain approximately the same deformed shape. However, the material has sufficient "memory" so that with the packing arrangement of my invention the packing rings have an inherent tendency to maintain sealing pressure against the inner and outer cylindrical surfaces of the packing gland.

The efficient guiding action of the close fitting end caps combines with the improved method of maintaining sealing pressure to produce a packing arrangement which is relatively insensitive to side loads on the stem.

As shown in FIG. 3, the lower concave surfaces 72 of the packing rings 66 are deformed to fit the upper convex surface of the spacer rings 65. In the case of the lower packing ring, these surfaces are deformed to fit the upper convex surface of the end cap 67.

It has been found that the compressive action of the mechanical and pressure forces cause lips 90 and 91 to be formed on the packing rings 66 extending downward between surfaces 84 and 85 of the spacer rings 65 and the surfaces 53 and 52 which define the walls of the packing gland. This seems somewhat surprising inasmuch as the lips extend against the direction of the fluid pressure. However, one may consider that the lips are formed more by the spacer ring pushing upward into the packing ring than from the lips extruding downward.

The width of the lips formed is, of course, determined by the width of the spacer ring relative to the width of the gland. In a typical case, the gland width might be 3/8", the spacer thickness 1/32", measured perpendicular to surfaces 72a and 72b, and the lips 90 and 91 approximately .015" to .020" thick.

The lips 90 and 91 tend to lay tightly against the walls of the glands 53 and 52 and are further expanded by the fluid pressure, thus aiding in the sealing ability of the packing rings.

A second reason for allowing space between the spacer rings and the walls of the gland is ease of manufacture and ease of assembly. Under the extreme pressures for which this packing means is designed, polytetrafluoroethylene packing materials will extrude between the spacer ring and the wall of the gland unless the fit is very close. A thin fragile lip on the packing ring would serve no purpose and be undesirable from the standpoint of being very fragile. To try to fit the spacer rings to the width of the gland so as to eliminate extrusion entirely would require very careful machine work on these rings and would create difficulties during assembly. Any small angularity of the ring relative to the axis of the stem would cause it to bind.

As shown in FIG. 3, lips 90 and 91 are not formed on the lower packing ring. If desired, an additional spacer ring may be employed between the lower packing ring and the lower end cap. This will permit lips 90 and 91 to also form on this packing ring. The same result could be accomplished by forming the lower end cap with an annular extension on its upper side having the same configuration as spacer ring 65.

The embodiment shown in FIG. 4 is similar to FIG. 2. The conical surface on the upper convex side of packing rings 93 have approximately the same angle as the conical surfaces on the lower concave side of the spacer rings 94 and the upper end cap 95. Likewise, the conical surfaces on the lower concave side of the packing rings 93 have a smaller angle than the corresponding surfaces on the upper convex side of the spacer rings 94 and the upper convex side of the lower end cap 67. The angular difference then is equivalent to that of the embodiment shown in FIG. 2. However, these angles are arrived at by making the differential angle between the upper and lower surfaces of the spacer rings rather than between the upper and lower surfaces of the packing rings as in FIG. 2.

The embodiment shown in FIG. 5 is similar to the previous embodiments, except that the upper surfaces of the packing rings 97 are formed with a lesser angle than the lower surfaces of the spacer rings 65 and the upper end cap 68. Thus compressing the packing assembly places force on the center of the upper surfaces of the packing rings as well as near the outer edges of the lower surfaces of the packing rings, thus giving an added tendency to expand the packing rings against the walls of the gland when they are compressed in service.

I have thus far illustrated my invention by means of V-ring type packings employing packing rings, spacers and end caps whose interacting concave and convex surfaces were formed in the most part of conical surfaces. However, the same action may be obtained by employing rings whose convex and concave surfaces are formed from annular curved surfaces or from a combination of such curved surfaces and conical surfaces.

FIG. 6 is similar to FIG. 2 but illustrates another embodiment of the invention employing curved surfaces. The packing assembly shown in FIG. 6 comprises a plurality of packing rings 101, one or more spacer rings 102, a lower end cap 103 and an upper end cap 104.

The spacer rings 102 are provided with an upper convex surface 105 and a lower concave surface 106. Likewise, the packing rings are each provided with an upper convex surface 107 and a lower concave surface 108.

The concave surface 108 of the packing ring and the convex surface 105 of the spacer ring are similar in shape, but the concave surface of the packing ring is formed more acutely convergent than the convex surface of the spacer ring, thus making the portion of the concave surface of the packing ring which mates with the convex surface of the spacer ring of greater axial depth. Thus, when the packing assembly is installed in the gland and compressed, the packing rings will be deformed to conform to the spacer rings, the same as described in connection with the embodiment illustrated in FIGS. 2 and 3.

The lower concave surface of the spacer ring may be formed with approximately the same shape as the upper convex surface of the packing rings, to give the same type of fit as obtained with the embodiment shown in FIGS. 2 and 4, or the concave surface of the spacer ring may be formed with a somewhat lesser depth to obtain the same type of action as with the embodiment shown in FIG. 5.

The fits of the various rings compared to the gland width and the materials of construction are preferably the same as described in connection with the embodiment shown in FIG. 2. Thus, when the packing assembly of FIG. 6 is compressed in the packing gland, dependent lips similar to 90 and 91 shown in FIG. 3, will be formed on the packing rings.

In describing my invention in relation to preferred embodiments thereof, it is to be understood that the invention is not limited thereto but may be variously modified without departure from the spirit of the invention as set forth in the appended claims.

While this invention is described in relation to a packing for a rod or shaft, and more particularly for a valve stem, it should be understood that it is not limited thereto but could just as readily be applied to a packing for a piston to operate in a cylinder.

What I claim is:
1. A packing assembly of the V-ring type adapted to seal between rigid inner and outer members having spaced inner and outer concentric cylindrical sealing surfaces comprising:
   a plurality of packing rings of flexile material, and
   at least one relatively rigid spacer ring,
   said packing rings each having a convex and a concave surface,
   said spacer rings each having a first concave surface adapted to engage and nest with the convex surface of one of said packing rings and a second convex surface adapted to engage and nest in the concave surface of one of said packing rings,
   each of said spacer rings being positioned on the concave side of one of said packing rings,
   the concave surfaces of said packing rings being more acutely convergent than said second surface when said packing assembly has not been axially compressed.
2. The packing assembly of claim 1 further comprising:
   an end cap formed of relatively rigid reinforced flexile material having inner and outer annular surfaces adapted for closely fitting with said concentric cylindrical sealing surfaces.
3. The packing assembly of claim 1 wherein:
   said flexile material is deformable under high pressures.
4. The packing assembly of claim 1 wherein:
   said flexile material is polytetrafluoroethylene.
5. The packing assembly of claim 1 further comprising:
   an end cap formed of relatively rigid reinforced polytetrafluoroethylene having inner and outer annular surfaces adapted for closely fitting with said concentric cylindrical sealing surfaces.
6. The combination of
   an annular packing assembly,
   rigid inner and outer members having spaced concentric cylindrical sealing surfaces, and
   means for axially compressing said packing assembly, said members being movable relative to each other,
   said packing assembly coaxial with said cylindrical sealing surfaces and adapted for sealing engagement therewith, and comprising:
      an annular seal ring of flexile material having a concave side facing against the direction of pressure, and
      an annular thrust member of rigid material having a convex surface nesting with said concave side,
      said thrust member having substantially cylindrical inner and outer surfaces in spaced relationship with said cylindrical sealing surfaces whereby extrusion gaps are provided.
7. The packing assembly of claim 6 wherein:
   said means for axially compressing said packing assembly is capable of providing sufficient force to extrude the inner and outer portions of said packing ring into said extrusion gaps, thereby forming thin dependent lips on said packing ring.
8. The packing assembly of claim 6 wherein:
   said flexile material is polytetrafluoroethylene.
9. The packing assembly of claim 6 wherein:
   the surface of said concave side is more acutely convergent than said convex surface before said packing assembly is axially compressed.
10. The packing assembly of claim 6 further comprising:
    an end cap formed of relatively rigid reinforced polytetrafluoroethylene having inner and outer annular surfaces closely fitting said concentric cylindrical sealing surfaces.
11. The packing assembly of claim 6 further comprising:
    an end cap formed of relatively rigid reinforced flexile material having inner and outer annular surfaces closely fitting said concentric cylindrical sealing surfaces.
12. The combination of
    a packing assembly of the V-ring type sealing between rigid inner and outer members having spaced inner and outer concentric cylindrical sealing surfaces, and
    means for axially compressing said packing assembly, said packing assembly comprising:
    a plurality of coaxial packing rings of flexile material,
    at least one relatively rigid spacer ring coaxial with said packing rings,
    said packing rings and said spacer rings each having a convex and a concave surface,
    the convex surface of each of said spacer rings engaging and nesting in the concave surface of one of said packing rings,
    the concave surface of said packing rings being more acutely convergent than said convex surface of said spacer rings before said packing assembly is axially compressed.
13. The packing assembly of claim 12 wherein:
    said flexile material is polytetrafluoroethylene.
14. The packing assembly of claim 12 further comprising:
    an end cap formed of relatively rigid reinforced flexile material having inner and outer annular surfaces adapted for closely fitting with said concentric cylindrical sealing surfaces.
15. The packing assembly of claim 12 wherein:
    said spacer ring is provided with substantially cylindrical inner and outer surfaces in spaced relationship with said cylindrical sealing surfaces, whereby extrusion gaps are provided.
16. A method of forming a packing ring of plastic material comprising the steps of:
    (a) providing an annular V-ring shaped ring of said material with inner and outer sealing surfaces and an axially facing concave side;
    (b) inserting said ring in a packing gland with said concave side facing against the direction of pressure and adjacent to a relatively rigid annular member having a cooperating convex surface joined to substantially cylindrical inner and outer surfaces which are in spaced relationship to the inner and outer sur- faces of said packing gland, said convex surface being of lesser axial height than the depth of the portion of said concave side of said packing ring adjacent to said convex surface; and (c) axially compressing said packing ring against said rigid member to deform said concave side and form thin axially depending lips on the inner and outer diameters of said packing ring.

17. The packing assembly of claim 12 wherein said spacer rings are formed of metal.

References Cited

UNITED STATES PATENTS

| 2,417,840 | 3/1947 | Rodgers et al. | 277—124 |
| 3,179,426 | 4/1965 | Duer | 277—112 |

HOUSTON S. BELL, Jr., Primary Examiner

U.S. Cl. X.R.

277—124, 125, 205